(12) United States Patent
Laver et al.

(10) Patent No.: US 7,599,308 B2
(45) Date of Patent: Oct. 6, 2009

(54) METHODS AND APPARATUS FOR IDENTIFYING CHRONIC PERFORMANCE PROBLEMS ON DATA NETWORKS

(75) Inventors: Kent Laver, Kanata (CA); Matthew A. Tucker, Gaithersburg, MD (US)

(73) Assignee: Fluke Corporation, Everett, WA (US)

( * ) Notice: Subject to any disclaimer, the term of this patent is extended or adjusted under 35 U.S.C. 154(b) by 652 days.

(21) Appl. No.: 11/217,477

(22) Filed: Sep. 2, 2005

(65) Prior Publication Data

US 2006/0176824 A1 Aug. 10, 2006

Related U.S. Application Data

(60) Provisional application No. 60/649,583, filed on Feb. 4, 2005.

(51) Int. Cl.
*H04L 12/26* (2006.01)
(52) U.S. Cl. .................................. 370/252
(58) Field of Classification Search ............... 709/224; 717/100, 104, 105, 124, 125
See application file for complete search history.

(56) References Cited

U.S. PATENT DOCUMENTS

| | | | |
|---|---|---|---|
| 3,813,647 A | 5/1974 | Loo | |
| 5,487,148 A | 1/1996 | Komori et al. | |
| 5,519,830 A | 5/1996 | Opoczynski | |
| 5,636,344 A | 6/1997 | Lewis | |
| 5,646,864 A | 7/1997 | Whitney | |
| 5,655,068 A | 8/1997 | Opoczynski | |
| 5,790,780 A | 8/1998 | Brichta et al. | |
| 5,796,633 A | 8/1998 | Burgess et al. | |
| 5,923,849 A | 7/1999 | Venkatraman | |
| 5,936,958 A * | 8/1999 | Soumiya et al. | 370/395.43 |
| 6,018,300 A | 1/2000 | Dowden et al. | |
| 6,061,725 A | 5/2000 | Schwaller et al. | |
| 6,253,339 B1 | 6/2001 | Tse et al. | |
| 6,269,330 B1 | 7/2001 | Cidon et al. | |
| 6,397,359 B1 | 5/2002 | Chandra et al. | |
| 6,424,927 B1 | 7/2002 | Sechi et al. | |
| 6,598,183 B1 | 7/2003 | Grieco et al. | |
| 6,639,538 B1 | 10/2003 | Sechi et al. | |
| 6,643,613 B2 * | 11/2003 | McGee et al. | 702/186 |

(Continued)

FOREIGN PATENT DOCUMENTS

EP 1 206 085 A2 5/2002

*Primary Examiner*—Kwang B Yao
*Assistant Examiner*—Alex Skripnikov
(74) *Attorney, Agent, or Firm*—Edell, Shapiro & Finnan, LLC

(57) ABSTRACT

A system for identifying chronic performance problems on data networks includes network monitoring devices that provide measurements of performance metrics such as latency, jitter, and throughput, and a processing system for analyzing measurement data to identify the onset of chronic performance problems. Network behavior is analyzed to develop a baseline performance level (e.g., computing a mean and variance of a baseline sample of performance metric measurements). An operating performance level is measured during operation of the network (e.g., computing a mean and variance of an operating sample of performance metric measurements). A chronic performance problem is identified if the operating performance level exceeds a performance threshold and a difference between the baseline performance level and the operating performance level is determined to be statistically significant. A t-test based on the baseline mean and variance and the operating mean and variance can be used to determine if this difference is significant.

19 Claims, 3 Drawing Sheets

U.S. PATENT DOCUMENTS

| | | |
|---|---|---|
| 6,643,614 B2 | 11/2003 | Ding et al. |
| 6,678,250 B1 | 1/2004 | Grabelsky et al. |
| 6,691,256 B1 | 2/2004 | Cook et al. |
| 6,711,137 B1 | 3/2004 | Klassen et al. |
| 6,754,854 B2 | 6/2004 | Kurrasch |
| 6,763,380 B1 | 7/2004 | Mayton et al. |
| 6,836,800 B1 * | 12/2004 | Sweet et al. ............... 709/224 |
| 2002/0174217 A1 | 11/2002 | Anderson |
| 2003/0065986 A1 | 4/2003 | Fraenkel et al. |
| 2003/0079011 A1 | 4/2003 | Schilling et al. |
| 2003/0084146 A1 | 5/2003 | Schilling et al. |
| 2003/0149919 A1 | 8/2003 | Greenwald et al. |
| 2003/0152034 A1 | 8/2003 | Zhang et al. |
| 2003/0208523 A1 | 11/2003 | Gopalan et al. |
| 2004/0064760 A1 | 4/2004 | Hicks et al. |
| 2004/0088400 A1 | 5/2004 | Daggett |
| 2004/0117150 A1 | 6/2004 | Cuddihy et al. |

* cited by examiner

METHODS AND APPARATUS FOR IDENTIFYING CHRONIC PERFORMANCE PROBLEMS ON DATA NETWORKS

CROSS REFERENCE TO RELATED APPLICATION

This application claims priority from U.S. Provisional Patent Application Ser. No. 60/649,583 entitled "Method and Apparatus for Prediction of Chronic Performance Problems on Packetized Data Networks," filed Feb. 4, 2005. The disclosure of this provisional patent application is incorporated herein by reference in its entirety.

BACKGROUND OF THE INVENTION

1. Field of the Invention

The present invention relates to methods and apparatus for identifying chronic performance problems on data networks.

2. Description of the Related Art

Packetized data networks are in widespread use transporting mission critical data throughout the world. A typical data transmission system includes a plurality of customer (user) sites and a data packet switching network, which resides between the sites to facilitate communication among the sites via paths through the network.

Packetized data networks typically format data into packets for transmission from one site to another. In particular, the data is partitioned into separate packets at a transmission site, wherein the packets usually include headers containing information relating to packet data and routing. The packets are transmitted to a destination site in accordance with any of several conventional data transmission protocols known in the art (e.g., Asynchronous Transfer Mode (ATM), Frame Relay, High Level Data Link Control (HDLC), X.25, IP, Ethernet, etc.), by which the transmitted data is restored from the packets received at the destination site.

The performance of these networks can be effectively measured using performance metrics such as packet latency, jitter (delay variation), and throughput. Persistent chronic network performance problems result in significant degradation in the performance of the network. Chronic latency, jitter, and throughput problems dramatically impact the transfer of important information and consequently impact business productivity and effectiveness.

Chronic excessive latency is a significant increase in the time required for data to traverse the network and is one of the major underlying causes of user dissatisfaction with network performance and service levels. Durations of persistent chronic excessive latency may occur for hours or days. Users typically experience chronic excessive latency as substantial increases in application response time and/or failed transactions.

Chronic excessive jitter may render voice or video streaming unintelligible. Excessive jitter will cause an unacceptable number of packets to be excluded from a reconstructed realtime output signal resulting in perceptible distortions in an audio or video output signal. Users typically experience chronic excessive jitter as a substantial disruption in their ability to understand the streaming media (e.g. voice or video) that they are receiving.

Chronic excessive throughput problems may prevent critical backup or disaster recovery functionality. Users typically experience chronic excessive throughput problems as a substantial increase in the time required to access a remote resource.

Most packetized data networks exhibit predictable, stable behavior in terms of latency, jitter, and throughput. For example, most data packets traversing a domestic network may require 70 ms for a request and reply to traverse the network. This average latency may remain fairly stable over extended periods. Nevertheless, during these periods, networks can experience transient increases in traffic latency. For example, occasionally some data packets on the same network may require 200 ms or more to traverse the network. These transient increases in traffic latency are very different from chronic problems, because they typically do not affect perceived service levels. Transient occurrences of excessive latency, jitter, or throughput are a normal part of network operations and do not warrant dedicated corrective action.

However, problems with chronic excessive performance problems and the consequential impact on business productivity and effectiveness do require explicit corrective action. This is particularly important, because the cost of resolving these problems can be a significant proportion of the support and management costs for network service providers.

Currently, there is no reliable mechanism for effectively recognizing or predicting the onset of periods of chronic performance problems. Service providers cannot distinguish between transient and persistent problems. The requirement to avoid expensive and unnecessary responses to transient problems means that the required corrective action for persistent problems is delayed, resulting in reduced business productivity and effectiveness.

Current network management tools allow the detection of excessive latency, excessive jitter, decreased throughput, and the like. Network management tools also provide for the generation of alerts informing network operators of certain problems. These techniques range in sophistication from simple ping echo tests to network monitoring devices performing accurate and precise testing and reporting, as described, for example, in U.S. Pat. Nos. 5,521,907, 6,058, 102, and 6,147,998, the disclosures of which are incorporated herein by reference in their entireties. These patents describe how remote monitoring devices accurately and reliably measure performance metrics including point to point network latency, round-trip delay, throughput, and data delivery ratio. However, current network management tools cannot distinguish between chronic excessive problems and transient excessive problems. Nor can these tools predict the onset of chronic excessive problems. This deficiency degrades the ability of network managers to maintain high availability networks with minimal problems.

From a service provider's standpoint, it would be desirable to detect the onset of a persistent problem that requires attention before the client complains about poor performance. Accordingly, there remains a need for the capability to identify chronic performance problems on data networks in an automated manner, while accurately distinguishing such chronic performance problems from transient problems.

SUMMARY OF THE INVENTION

In accordance with the present invention, a system for identifying chronic performance problems on data networks includes remote network monitoring devices that provide measurements of performance metrics such as latency, jitter, and throughput, and a storage and processing system, such as a backend system, for collecting and storing data, monitoring and analyzing network performance, and notifying network operators when chronic performance problems are detected. The system provides accurate and reliable measurement of network latency, jitter and throughput; management of user performance requirements with configurable sensitivity; a context-sensitive data repository which enables the assessment and evaluation of network performance with respect to circuit, time, bandwidth and performance requirements; and predictions of chronic network performance problems by using statistical and heuristic analysis techniques.

Chronic performance problems may be recognized via the following methodology. Network behavior is analyzed during an extended period where performance is considered normal or acceptable. This analysis is used to develop a baseline incorporating the average (mean) performance and the variability of the performance during normal operations. Criteria are then established for the network performance levels leading the user to perceive service levels degradations. Criteria are also established for the required confidence levels of chronic network performance problem predictions. These confidence levels are used to control the likelihood that detected problems will be deemed transient and not require specific corrective action. These criteria and confidence levels are established heuristically and can be dynamically adjusted.

Continuous monitoring of ongoing network performance is then performed, comparing current performance with the baseline behavior, using the network performance criteria to filter out and identify network problems which are judged to be service-impacting and chronic. When a chronic network performance problem is identified, an alert and diagnosis are provided.

Chronic excessive performance problems may be identified (and distinguished from transient problems) using the statistical "t-test" to estimate the likelihood that a detected degradation in network latency is persistent. Essentially, a t-test assesses whether the means of two groups are statistically different from each other with a certain level of confidence by comparing the means of samples from the two groups, taking into consideration the variance of the samples. In this case, when a transient reduction in performance occurs, the t-test is used to compare the mean of one or more performance metrics under baseline conditions to the mean of the performance metric(s) over a recent period of operation and identifies the performance problem as chronic if the t-test suggests the mean performance is statistically different from the baseline. At a given point in time, such a test may fail to detect a chronic performance problem or, conversely, falsely detect a chronic problem when one does not in fact exist. The selected confidence levels, which translate to a significant or "alpha" level within the t-test, control the likelihood of a false detection of a chronic problem.

The above and still further objects, features and advantages of the present invention will become apparent upon consideration of the following definitions, descriptions and descriptive figures of specific embodiments thereof wherein like reference numerals in the various figures are utilized to designate like components. While these descriptions go into specific details of the invention, it should be understood that variations may and do exist and would be apparent to those skilled in the art based on the descriptions herein.

DESCRIPTION OF THE PREFERRED EMBODIMENTS

Figure 1:
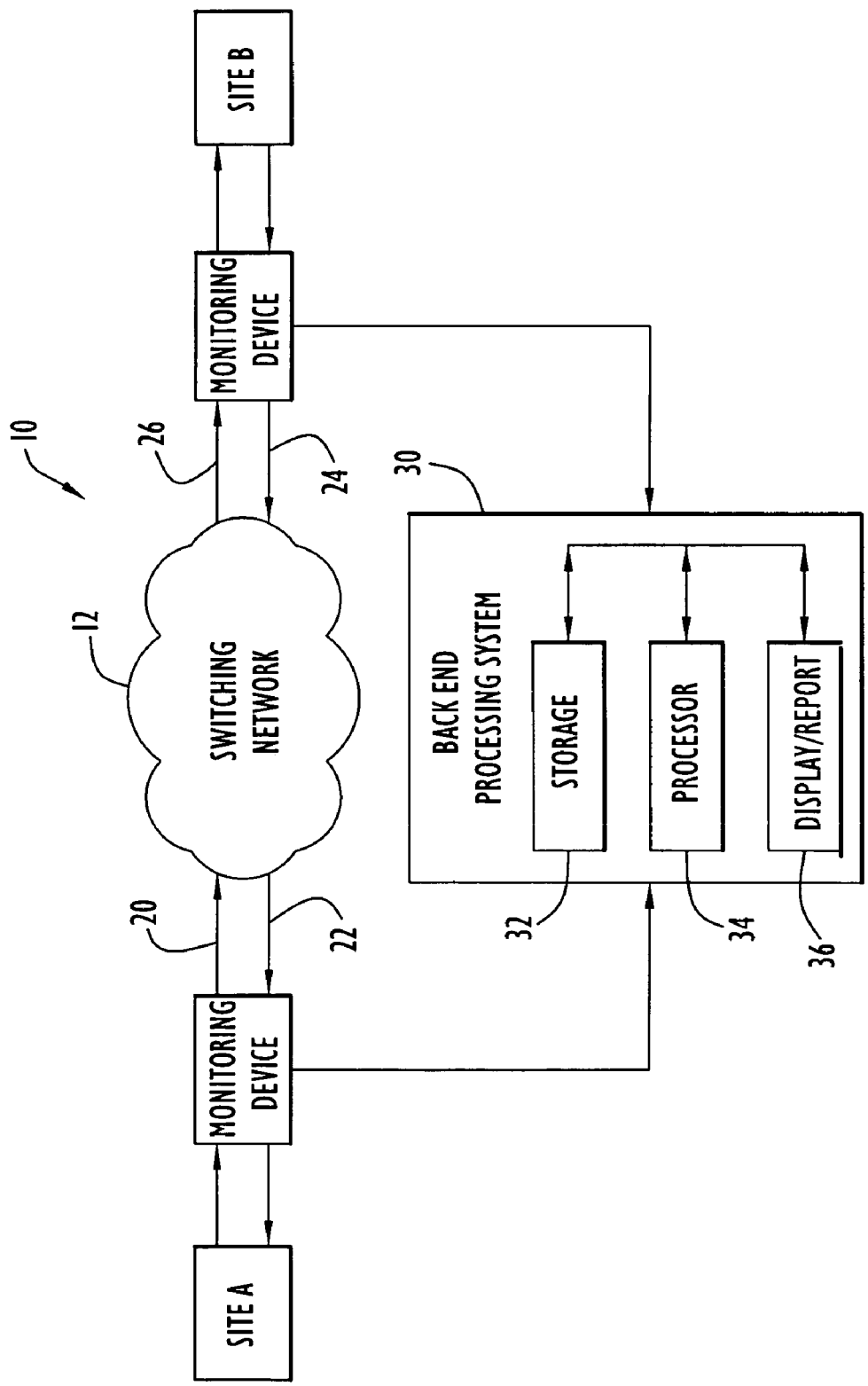
FIG. 1 is a functional block diagram of a data transmission system including monitoring devices located at different points in the system to measure data traffic performance metrics on a communication network, and a backend processing system.
Figure 2:
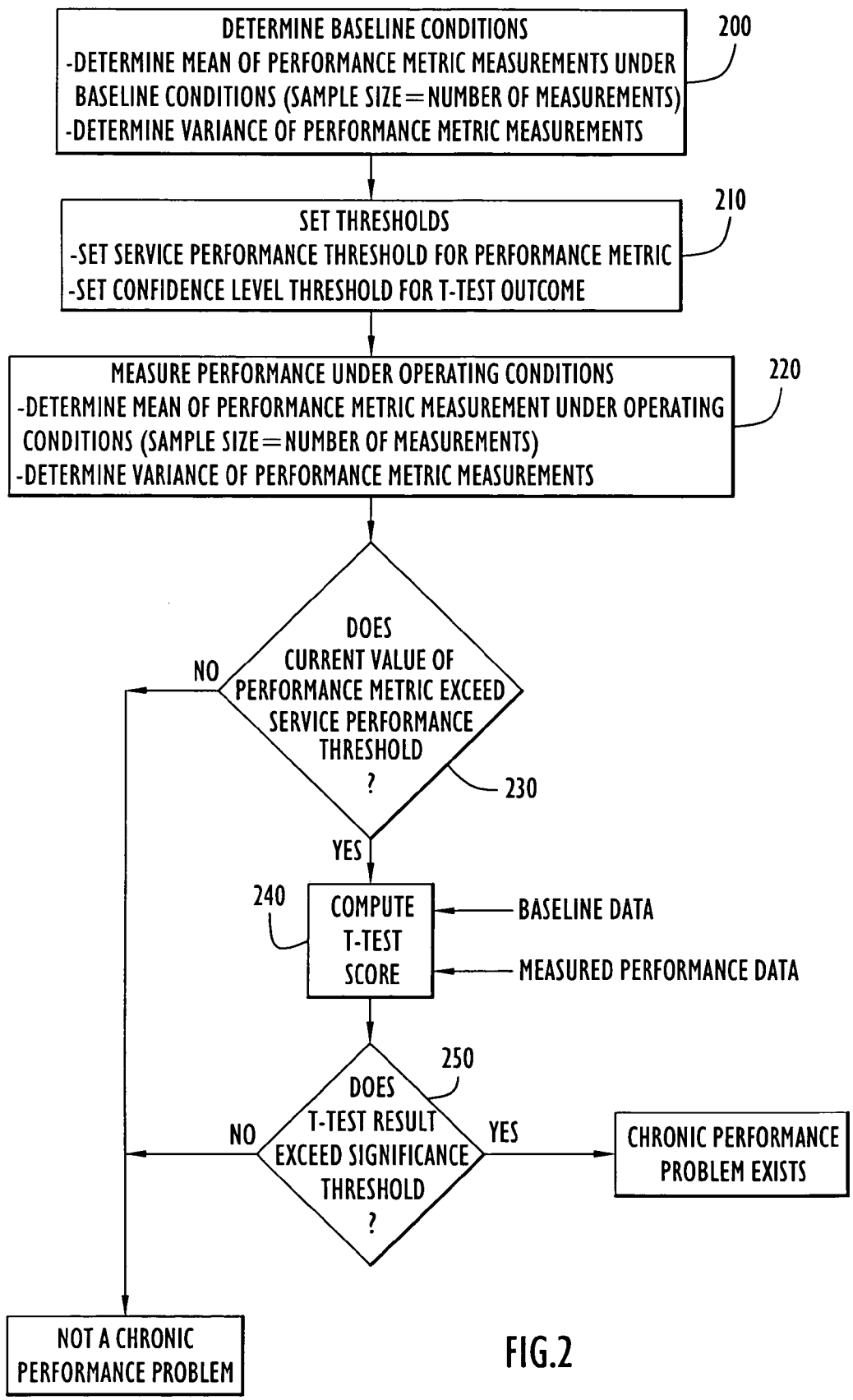
FIG. 2 is a functional flow chart illustrating operations performed to determine whether a chronic performance problem exists on a data network in accordance with an exemplary embodiment of the invention.
Figure 3:
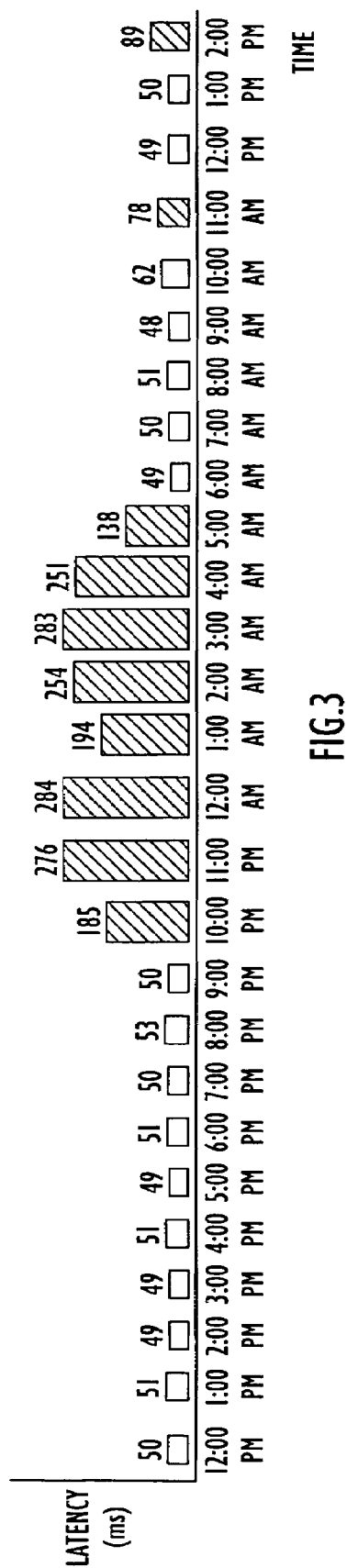
FIG. 3 is a graph illustrating a scenario in which a modest rise in latency on a network with stable performance and a small latency variance results in a determination of chronic latency problem requiring attention.

The following detailed explanations of FIGS. 1-3 and of the preferred embodiments reveal the methods and apparatus of the present invention. A system for monitoring performance for data communication networks is illustrated in FIG. 1. Specifically, an exemplary data transmission system 10 includes two sites (A and B) and a packet switching network 12 to facilitate communications between the sites. Site A is connected to the network by communication lines 20 and 22, which are accessible to a first monitoring device A, and site B is connected to the network by communication lines 24 and 26, which are accessible to a second monitoring device B. As used herein the terms "data network," "switching network," "network,: etc. refer to networks that carry virtually any kind of information and are not limited to any particular type of hardware, technology, application, or data (audio, video, digital data, telephony, etc.).

The data transmission system 10 can include conventional communications line types, for example, T3, OC-3, North American T1 (1.544 Mbits/second), CCITT (variable rate), 56K or 64K North American Digital Dataphone Service (DDS), Ethernet, and a variety of data communications connections, such as V.35, RS-449, EIA 530, X.21 and RS-232. Sites A and B are each capable of transmitting and receiving data packets in various protocols utilized by the communication lines, such as Asynchronous Transfer Mode (ATM), Frame Relay, High Level Data Link Control (HDLC) and X.25, IP, Ethernet, etc. Each line 20, 22, 24, 26 represents a respective transmission direction as indicated by the arrows. For example, the arrows on communication lines 20 and 22 represent transmissions from site A to the network and from the network to site A, respectively, while the arrows on communication lines 24 and 26 represent transmissions from site B to the network and from the network to site B, respectively.

Generally, site A and site B utilize switching network 12 to communicate with each other, wherein each site is connected to switching network 12 that provides paths between the sites. For illustrative purposes, only two sites (A and B) are shown in FIG. 1. However, it will be understood that the data communication system can include numerous sites, wherein each site is generally connected to multiple other sites over corresponding transmission circuits within the switching network. Likewise, monitoring devices may be positioned at various points throughout the system, including endpoints associated with particular sites (as shown in FIG. 1) or at intermediate points in the switching network.

As used herein, the term "packet" (e.g., as used in "packetized switching network") does not imply any particular transmission protocol and can refer to units or segments of data in a system using, for example, any one or combination of the above-listed data transmission protocols (or other protocols). However, since the term "packet" is often associated with only certain data transmission protocols, to avoid any suggestion that the system of the present invention is limited to any particular data transmission protocols, the term "protocol data unit" (PDU) will be used herein to refer generically to the unit of data being transported by the communication network, including any discrete packaging of information. Thus, for example, a PDU can be carried on a frame in the frame relay protocol, a related set of cells in the ATM protocol, a packet in an IP protocol, etc.

As shown in FIG. 1, monitoring devices A and B are respectively disposed between switching network 12 and sites A and B. Monitoring devices A and B can be located at sites A and B, at any point between switching network 12 and sites A and B, or at points within the switching network itself. The placement of the monitoring devices depends at least in part on the portion of the system or network over which a network service provider or other party wishes to monitor performance of data traffic flow. Typically, when service providers and customers enter into a service level agreement, the service provider will want any performance commitments to be limited to equipment or portions of the network over which it has control. The service provider does not want to be responsible for performance problems or degradation caused by end-site equipment or portions of the network not owed or managed by the service provider. On the other hand, a customer may desire to have monitoring devices relatively close to the actual destinations to assess overall end-to-end performance. Further, a customer or service provider may wish to have monitoring devices at the edges of the network and at intermediate points in the network to help pinpoint specific segments of the network or equipment causing a degradation in performance. More generally, monitoring devices can be placed at virtually any point in the network or any point within an enterprise LAN.

In general, the monitoring devices can be any type of network monitoring device or probe and can comprise standalone hardware/software devices or software and/or hardware added to network equipment such as PCs, routers, CSU/DSUs (channel service unit/data service unit), FRADS, voice switches, phones, etc. Software embedded in the monitoring devices can collect network performance data for detailed analysis and report generation relating to any of a variety of performance metrics. By way of non-limiting example, a monitoring device can be a CSU/DSU that operates both as standard CSU/DSU and as managed devices capable of monitoring and inserting network management traffic; an inline device residing between a DSU and router, which monitors network traffic and inserts network management traffic; or a passive monitoring device that monitors network traffic only. The monitoring devices can be "active" monitoring devices capable of inserting PDUs into the data traffic (e.g., test PDUs) or "passive" monitoring devices that observe PDU data traffic without generating or inserting any test PDUs into the data traffic for the purpose of measuring performance metrics. Optionally, passive monitoring devices can forward measurement data to each other via an out of band channel or through a link other than the monitored network channel, thereby permitting passive monitoring devices to directly coordinate testing periods.

The monitoring devices can collect measurement data relating to any of a variety of performance metrics associated with operation of the network. In the examples provided herein, performance metrics such as latency, jitter, and throughput are described. However, it will be understood that the invention is not limited to the measurement or analysis of any particular performance metric or any particular combination of metrics, and the principles of the invention can be applied to virtually any type of measurements associated with performance or operation of a network.

In general, latency relates to the amount of time required for signals or PDUs to traverse the network. Latency can be evaluated in terms of one-way delays between two points, or round-trip delays relating to the time required for an outbound signal to traverse the network from a first point to a second point plus the time required for a reply signal to traverse the network from the second point back to the first point. Such measurements can be made in any of a variety of ways, including active and passive measurement schemes, such as those described in U.S. Pat. Nos. 5,521,907 and 6,058,102.

Jitter relates to the variation in delay among a set of PDUs. The quality of real-time data transmissions depends on the network's ability to deliver data with minimal variation in the packet delay. Typically, when PDUs of voice or video data are transmitted, a sequence of PDUs is sent to the network with fairly consistent time differences between successive PDUs, resulting in a relatively steady stream of PDUs. This stream of PDUs must essentially be reconstructed at the destination to accurately reproduce the audio or video signal. Due to conditions on the network, PDUs may experience different delays before arriving at a destination or may be dropped altogether and not reach the destination. PDUs arriving at the destination are buffered to compensate for some degree of delay variation. However, in real-time applications such as voice and video, the output signal must be generated from the data in the PDUs within a reasonable period of time to avoid perceptible delays in the output audio or video signal. Consequently, PDUs not received within a predetermined period of time are considered to be dropped, and the output signal is reconstructed without such PDUs to keep voice calls static free and video running smoothly. Excessive jitter will cause an unacceptable number of PDUs to be excluded from the reconstructed real-time output signal resulting in perceptible distortions in the audio or video output signal. Any of a variety of techniques can be used to measure jitter, including the techniques described in U.S. patent application Ser. No. 10/974,023, the disclosure of which is incorporated herein by reference in its entirety.

Throughput relates to the amount of data traffic received during a period of time, yielding a rate of data traffic or PDUs. The measured data rate may relate to a particular circuit, channel, site, application, user(s), or device, for example. In the case of a shared resource, such as a virtual circuit or channel, the actual throughput rate can be compared to a committed information rate to determine how the level of usage relates to levels agreed upon by the service provider and customer (e.g., in a service level agreement). Centralized backup schemes involving transmission of volumes of data to backup sites (e.g., for daily, overnight system backups) are sensitive to loss of throughput, since reduced throughput levels prevent backups from being completed in a timely manner. Techniques such as those described in U.S. Pat. No. 5,867,483 can be used to measure throughput. Related throughput metrics, such as data delivery ratio can also be evaluated, as described for example in U.S. Pat. No. 6,058,102.

Referring again to FIG. 1, the network monitoring system further includes a backend processing system 30 which receives measurement data either directly or indirectly from the monitoring devices, and collects and stores measurement data and processes the data to produce the various displays and reports required to monitor performance of the network and its components. The architecture depicted in FIG. 1 is a conceptual diagram illustrating major functional units and does not necessarily illustrate physical relationships or specific physical devices within the backend processing system or between the backend processing system and the monitoring devices. The configuration and components of the backend processing system can take many forms and are described herein only in general terms for context. Those skilled in the art will appreciate that the techniques described herein for identifying chronic performance problems can be implemented within any network monitoring system that collects data on performance metrics, regardless of the particular architecture of the system.

In general terms, backend processing system 30 includes a data storage capability represented by storage module 32 for storing measurement data as well as information generated by processing measurement data, such as aggregated report data, analysis results, and historical information. Processing system 30 further includes a management and processing capability represented in FIG. 1 by processor module 34, which performs various processing tasks, such as performing operations on raw measurement data to produce reports and performing analysis operations, such as the chronic performance analysis described herein. The system further includes a display, interface, and report capability represented by display/report module 36, which displays performance information in a tabular or graphical manner via an interactive graphical user interface, for example, and preferably includes the capability to generate various performance reports.

The backend system may receive measurement data directly from the monitoring devices or may receive measurement data indirectly (e.g., the monitoring devices may supply measurement data to a storage device at the local site, which is subsequently supplied to the backend system. Thus, the links shown in FIG. 1 between the monitoring devices and the backend processing system are merely indicative of the fact that measurements from the monitoring devices are ultimately supplied in some manner to a backend processing system. Further, the backend processing system may be located at a single site or may have components distributed throughout the network at multiple locations. For example, storage module 32 may constitute storage capabilities at a number of local sites as well as a storage capability at one or more backend processing sites. Likewise, various backend processing tasks, nominally represented by processor 34 in FIG. 1, may be performed by a number of different processors that carry out specific task and that may be distributed throughout the network. Similarly, the display/reporting capability may allow access to performance information via interfaces at a number of sites or via a web-based interface accessible to authorized customers or service provider personnel.

The processing required to identify chronic performance problems according to the invention can be carried out in a backend processing system such that shown in FIG. 1, although optionally at least some of the operations may be performed directly within the monitoring devices. The performance analysis scheme described herein can be incorporated into an auto-troubleshooting management system that enables system operators to identify and react more quickly to problems within a data network.

FIG. 2 is a functional flow diagram of the operations performed to identify chronic performance problems on a data network in accordance with an exemplary embodiment of the invention. In a first operation 200, baseline operating conditions are determined during normal operation, i.e., a period of time in which behavior of the monitored network or portion of the network is considered acceptable. Typically, when a new network or portion of a network (e.g., a new site, channel, circuit, link, etc.) is initially switched on, adjustments are required to achieve normal, acceptable operation. Once such conditions are established, and the variation in the performance metrics of interest is relatively small, the baseline conditions can be determined.

During the baseline data collection period, one or more monitoring devices periodically collect performance metric measurements on one or more performance metrics of interest. For example, a monitoring device may make instantaneous measurements of PDU latency, throughput, and jitter at periodic increments of time (e.g., every second) over a measurement period (e.g., every fifteen minutes). The invention is not limited to any particular performance metrics, and other performance metrics could be evaluated, including but not limited to: data delivery ratio; and joint or composite performance metrics constructed from combinations of latency, jitter, and throughput, etc.

At the end of the measurement period, a measurement value is computed for the performance metric(s) based on the instantaneous measurements (e.g., by computing the average value). Thus, each measurement period results in a single measurement value of the performance metric(s). In the example of a fifteen minute measurement interval, one performance metric measurement is generated every fifteen minutes. The invention is not limited to measurement periods of any particular duration or any particular number of instantaneous measurements made during a measurement period. Thus, for example, a measurement value could be taken and analysis performed every second, minute, hour, day, etc., or at irregular intervals (e.g., upon the occurrence of a particular event). Likewise, a measurement value can be a "raw" measurement or determined from a set of measurements (e.g., by some computation or aggregation).

Determining baseline conditions involves computing the mean and variance of a set of performance metric measurements. To develop a good, accurate baseline, the sample size (i.e., the number of measurements) used to compute the mean and variance is preferably a substantial number. That is, the longer the baseline data collection period, the greater the confidence that the baseline statistics are accurate. By way of a non-limiting example, the baseline data collection period can be a week long which, in the case of a fifteen minute measurement period, would result in a sample size of 672 measurements. The invention is not limited to any particular baseline sample size or a baseline data collection period of any particular length.

The baseline sample can be considered a first random sample $(X_1, X_2, \ldots, X_{n_1})$ of size $n_1$ whose sample mean is denote by $\overline{X}$ and whose variance is denoted by $s_1^2$ where:

$$\overline{X} = \frac{1}{n_1} \sum_{i=1}^{n_1} X_i \tag{1}$$

$$s_1^2 = \frac{\sum_{i=1}^{n_1} (X_i - \overline{X})^2}{n_1 - 1} \tag{2}$$

The mean, variance, and sample size of the baseline sample are used to perform statistical testing on samples taken during ongoing operation of the network, as described in greater detail below.

While it is preferable to develop baseline statistics from baseline conditions on the actual network or portion of the network that will later be monitored, as described above, optionally, baseline conditions could be derived from other sources. For example, if the expected behavior of performance metrics to be monitored can be accurately modeled (e.g., the mean and variance of the performance metric under acceptable operating conditions can be reliably predicted with a certain degree of accuracy), then expected baseline conditions could be substituted for actual, measured baseline conditions.

Referring again to FIG. 2, in operation 210, thresholds to be used in testing of performance metrics to identify chronic problems are set. Essentially, two types of thresholds are set. The first type of threshold is a service performance threshold that relates to the current value of the performance metric measurement relative to the baseline value or some absolute value. One of the criteria for identifying a chronic performance problem is that the current value of the performance metric measurement (or a mean of recent values) exceeds the service performance threshold (this is a necessary but not sufficient condition to declare a chronic problem).

The service performance threshold can be selected in any number of ways. The threshold can be an absolute increase relative to the baseline mean of the performance metric. For example, for latency, the threshold could be set at a fixed value of 40 ms greater than the baseline mean latency. The service performance threshold could also be set as an absolute limit, irrespective of the baseline mean value of the performance metric. For example, the latency threshold could be set at a predetermined value of 100 ms. The service performance threshold could also be set as a relative increase with respect to the baseline mean value of the performance metric, for example, a 30% increase. Another option is to set a threshold that is a certain number of standard deviations away from a baseline operating mean value. Any one or combination of these criteria could be used to develop the service performance threshold. For example, a combination of an absolute limit and a relative increase may produce a threshold better suited to real-world conditions. Consider an example where the baseline mean latency is 50 ms. Using only the criterion of a relative increase (e.g., 30%), the service performance threshold would be set at 65 ms. However, as a practical matter, it is also known that any customer line having a latency below 70 ms is considered to be operating acceptably; thus, the absolute threshold should not be set below this level. Using a combination of criteria, the threshold could be set to a relative increase over the baseline mean latency or at an absolute value (e.g., 70 ms), which ever is greater. Naturally, such thresholds may be context specific. For example, a 70 ms latency may be acceptable for local service, whereas a latency of 120 ms may be more suitable for national service.

In addition to setting the service performance threshold, a confidence level threshold associated with statistical testing of the performance metric data is selected. As described in greater detail below, merely exceeding the service performance threshold is not sufficient to conclude that a chronic performance problem has developed. Essentially, the statistical testing attempts to identify a pattern of performance behavior that suggests the mean of performance metric measurements under ongoing operating conditions is significantly different from the baseline mean, thereby indicating that a chronic performance problem is developing. The confidence level threshold corresponds to a level of reliability of the statistical testing. A high confidence level threshold reduces the number of "false positives" from the statistical testing, such that there is high confidence that a chronic problem does indeed exist when the statistical testing indicates that the performance metric mean has changed from the baseline conditions. On the other hand, a high confidence level threshold increases the likelihood that a chronic problem may go undetected for a longer period of time. A lower confidence level threshold will result in more false alarms, but may detect a chronic problem more quickly.

Thus, the confidence level threshold determines how sensitive the system is to indicating there is a chronic problem, and selection of an appropriate confidence level threshold may depend on several consideration. For example, the confidence level threshold should be set to reflect how sensitive the particular customer or service provider is to being disturbed by a false alarm or by the onset of a chronic performance problem. This, in turn, may relate to the type of operation being performed or data being transmitted, terms of a service level agreement between the customer and service provider, or the particular preferences of the customer. If the baseline conditions are more noisy (a relatively large baseline variance), a relatively high confidence level may be appropriate to avoid frequent false alarms.

The confidence level threshold can be a configurable parameter that can be adjusted if necessary based on experience or past performance, such that the confidence level is heuristically determined (i.e., adjusted in response to past experience) either by human experience or by a software algorithm. Optionally, the confidence level threshold can be initially set to a default sensitivity level and then subsequently adjusted by the customer or service provider via a graphical user interface. For example, a drop-down menu can be used to let a customer select one of several confidence levels (high, moderate, low). Another option is a slider bar, which allows the confidence level threshold to be set to a number of values on a sliding scale by moving an indicator on the slider. The selected confidence level threshold internally corresponds to an a value used in the statistical t-testing, as described in greater detail below.

Once a baseline has been established and thresholds set, the network or portion of the network of interest is monitored by collecting measurements of one or more performance metrics (e.g., latency, throughput, jitter, etc.) from various monitoring devices, and these measurements are supplied to a processing system for analysis. Referring again to FIG. 2, there is shown an exemplary embodiment of processing performed during ongoing operation of the network to analyze whether a chronic performance problem exists. In operation 220, for each performance metric of interest, the mean and variance of recent measurements of the performance metric are periodically computed. Preferably, the computation is repeated each time a new measurement is available so that testing for chronic performance problems can be performed with each new measurement, thereby enhancing the likelihood of early detection of a chronic problem.

Essentially, the set of measurements within a certain time window constitutes an operating sample (a sample of measurements taken during operation of the network) that is used to compute the mean and variance during network operation. The time window extends over a period of time that covers the set of measurements, terminating with the most recent measurement of the performance metric. The time window can be of a predetermined duration or can cover a predetermined number of measurements. Optionally, the time window can be adjustable, variable, and/or user selectable. The number of measurements in the time window is the sample size $n_2$ of the operating sample. In general, as each new measurement becomes available, the time window slides forward and drops the oldest measurement from the operating sample used to compute the operating mean and variance, such that the operating sample slides forward in time.

The operating sample can be considered a second random sample $(Y_1, Y_2, \ldots, Y_{n2})$ of size $n_2$ whose mean is denote by $\overline{Y}$ and whose variance is denoted by $s_2^2$, where:

$$\overline{Y} = \frac{1}{n_2} \sum_{i=1}^{n_2} Y_i \qquad (3)$$

$$s_2^2 = \frac{\sum_{i=1}^{n_2} (Y_i - \overline{Y})^2}{n_2 - 1} \qquad (4)$$

A number of factors should be considered in selecting the sample size $n_2$ of the operating sample. Increasing the sample size tends to produce a more stable result, making the analysis less prone to a false indication of a chronic performance problem. However, a larger sample size requires a longer time window, which may unduly increase the time required to detect a chronic performance problem, since a significant number of older measurements within the time window may reflect acceptable operation prior to the onset of a problem, thereby diluting the impact of more recent measurements that suggest a problem. Conversely, if the time window is too short (e.g., only a few measurements in the sample), there is an increased risk that a transient problem could cover a substantial portion of the window, thereby triggering false detections of chronic problems. In this respect, setting the sample size is analogous to setting the gain of a filter, with a smaller sample size corresponding to a higher gain (which is highly responsive to recent input but more prone to "overreact" under certain conditions), and a larger sample size corresponding to a lower gain (which produces a smoother response but may not react quickly enough under certain conditions).

Returning to the earlier example where a new measurement of the performance metric becomes available every fifteen minutes, a sample size of 96 measurements would correspond to a full day's worth of measurements. A time window of this duration may be too long to timely detect the onset of a chronic performance problem in some circumstances, and a shorter time window of a few hours may be more suitable in such circumstances (e.g., a window of 4 or 5 hours corresponds to 16 or 20 measurements). If performance metric measurements are available more frequently, somewhat larger sample sizes can be used without unduly delaying detection of chronic performance problems.

Referring once again to FIG. 2, in the exemplary embodiment, the testing for detecting a chronic performance problem essentially involves two tests: a threshold test of the value of the performance metric; and a statistical test that indicates with some degree of confidence that the mean value of the performance metric has changed from the baseline value. In operation 230, a threshold test is conducted to determine whether the current value of the performance metric of interest exceeds the service performance threshold selected in the manner previously described. If the service performance threshold is not exceeded, performance is considered to be at an acceptable level (i.e., there is no performance problem detected, chronic or otherwise), and statistical testing is unnecessary to determine whether a performance problem is chronic. Accordingly, it is assumed that no chronic performance problem exists, and the testing ends until receipt of the next performance metric measurement.

If the current value of the performance metric of interest exceeds the service performance threshold, in operation 240, a t-test score is computed for the operating sample based on the baseline data and the measured performance data. In the context of the invention, the t-test essentially allows one to compare two sets of data (i.e., the baseline sample and the sample taken during ongoing network operation) and either "reject" or "fail to reject," with a certain degree of confidence, the hypothesis that the current operating conditions remain the same as the baseline conditions. That is, the t-test indicates whether the difference between the mean of the baseline sample and the mean of the operating sample is statistically significant to the point where it can be stated with a specified degree of confidence that the difference arose from an actual change in the performance metric being measured rather than by random chance. More specifically, the baseline (first) random sample $(X_1, X_2, \ldots, X_{n1})$ of size $n_1$ whose sample mean is denote by $\overline{X}$ (given by equation 1) and whose variance is denoted by $s_1^2$ (given by equation 2) is compared to an operating (second) random sample $(Y_1, Y_2, \ldots, Y_{n2})$ of size n2 whose mean is denote by $\overline{Y}$ (given by equation 3) and whose variance is denoted by $S_2^2$ (given by equation 4).

A value t can be computed by:

$$t = \frac{\overline{X} - \overline{Y}}{s_{pooled}\sqrt{\frac{1}{n_1} + \frac{1}{n_2}}} \qquad (5)$$

where $s_{pooled}^2$ is given by:

$$s_{pooled}^2 = \frac{(n_1 - 1)s_1^2 + (n_2 - 1)s_2^2}{n_1 + n_2 - 2} \qquad (6)$$

The value t can also be computed using a slightly different but simpler expression:

$$t = \frac{\overline{X} - \overline{Y}}{\sqrt{\frac{s_1^2}{n_1} + \frac{s_2^2}{n_2}}} \qquad (7)$$

The computation for the value t may vary somewhat based on statistical assumptions, and the invention is not limited to a particular computation for the value t.

Essentially, what is being tested is that the actual, true mean $\mu_1$ of the performance metric during the baseline conditions (which is unknown) is the same as the actual mean $\mu_2$ of the performance metric during the period of operating in which the operating sample was taken (which is also unknown). The statistical hypothesis is that the means are the same. In operation 250, if the computed value of t is less than a certain threshold $t_\alpha$, then the hypothesis is "not rejected," and it is assumed that the difference between the means of the baseline and operating samples is statistically insignificant and does not indicate a meaningful change in the performance metric from the baseline condition. Consequently, it is concluded that performance problem is not a chronic problem, and the testing ends until receipt of the next performance metric measurement. On the other hand, if the computed value of t exceeds the threshold $t_\alpha$ then the hypothesis is rejected, and it is assumed that the difference between the means of the baseline and operating samples is statistically significant and indicates a meaningful change in the performance metric from the baseline condition. Consequently, it is concluded that a chronic performance problem exists.

The value of $t_\alpha$ is a function of the degrees of freedom, which is equal to $n_1 + n_2 - 2$, and of the confidence level threshold selected in the manner described above. The confidence level threshold corresponds to t-test level of confidence (1−a).

Essentially, the value of $t_\alpha$ will result in a false alarm that there is a problem $(1-a)*100$ percent of the time.

With an ideal or statistically rigorous t-test, the value of $t_\alpha$ can be determined from the standard t distribution, based on the degrees of freedom and the value of a (e.g., such values are often provided in statistical tables). In practice, some of the assumptions associated with the t-test may not be met by the baseline and operating samples (e.g., the samples may not be normally distributed, the true variances may not be equal, the samples may not be random, the two samples may not be independent of each other, etc.). For this reason, the selected value of a (and hence $t_\alpha$) may not yield the precise rate of false alarms ideally expected. Nevertheless, even if these assumptions are not fully met, the t-test still provides a good indication of whether a meaningful change in performance has occurred relative to the baseline. A heuristic approach can be used to obtain the desired rate of false alarms, wherein after empirically observing the rate of false alarms during actual operation using an ideal value for $t_\alpha$, the value of $t_\alpha$ can be adjusted to a suitable value to obtain the desired false alarm rate.

The analysis performed according to the present invention involves forecasting in the sense that detection of a chronic problem amounts to an assertion that a problem is not transient; the problem is going to persist in the future. Thus, historical data is used to forecast that a problem will be ongoing. The t-test is well-suited to providing such a forecast, since the t-test, in effect, yields a reliable, objective indication, with a controllable level of confidence, of whether observed changes in performance are likely the result of a change of conditions rather than the result of chance. In effect, the t-test gives a measure consistency or reliability. When the t-test value exceeds the significance threshold $t_\alpha$, it suggests that a performance metric value that is over a service performance threshold is likely to stay above the threshold.

As will be appreciated from the foregoing description and from FIG. 2, two things must occur for a chronic problem to be detected: both the service performance threshold must be exceeded, indicating that some type of performance problem exist, and the t-test must indicate that the change in the mean value of the performance metric is significantly different from the baseline value. This combination of criteria filters out the circumstances that should not trigger detection of a chronic performance problem.

In one case, the value of the performance metric may be above the service performance threshold, but only for a short time, meaning the problem could be sporadic or transient. This case will typically fail the confidence test provided by the t-test, effectively indicating that there is not sufficient confidence that the problem is going to persist. In another case, the t-test could theoretically indicate a significant statistical deviation from baseline; however, if the service performance threshold has not been exceeded by the current value of the performance metric, the performance is still considered acceptable, so there is no concern that the customer is experiencing unacceptable performance. A problem is reported only if the performance is poor with some persistence.

The invention is not limited to the specific testing configuration shown in FIG. 2, and a number of variations are possible. For example, FIG. 2 suggests that the t-test is performed only if the service performance threshold is exceeded. Optionally, both the service performance threshold test and the t-test could be performed (performing of the t-test is not dependent on the outcome of the service performance threshold test), and the decision of whether a chronic performance problem exists is determined after the outcomes of the two tests are known (as opposed to the sequential logic shown in FIG. 2). The result of this approach is identical to the approach shown in FIG. 2, but would generally require more processing.

According to another approach, the sequence of the tests shown in FIG. 2 could be reversed, with the t-test being performed first and then the service performance threshold test being performed only if the t-test indicates a significant change of conditions.

In FIG. 2, the mean and standard deviation of the operating sample are computed in operation 220. In the sequence of operations shown in FIG. 2, optionally, computation of the mean and standard deviation of the operating sample could be deferred until the occurrence of the current value of the performance metric exceeding the service performance threshold, since the mean and standard deviation are required only if the t-test is actually performed.

Another option is to perform the service performance threshold testing by comparing the mean of the operating sample to the threshold rather than just the most recent (current) measurement of the performance metric (this would require the mean and standard deviation to be computed with each measurement, as shown in FIG. 2). However, using only the current value of the performance metric in the threshold test may have the advantage of permitting a more rapid detection of chronic problems, since the service performance threshold test fails every time a measurement exceeds the service performance threshold.

Optionally, the system can include a feature that allows historical data to be re-run through the chronic problem testing sequence using different thresholds to see if data that did not adequately trigger an alarm at a high threshold would have identified a chronic problem using a lower threshold (or, conversely, if a higher threshold would have avoided a false alarm). This feature assists in pro-actively adjusting thresholds.

Once the testing for chronic excessive service problems is completed, the test results can be supplied to a management system for inclusion in graphical displays of network performance and for report generation. In the event that a chronic performance problem is identified, the system can trigger an alarm or provide notice to an administrator of the condition. An alarm could be, for example, in the form of a visual indicator, an audible indicator or both.

FIG. 3 illustrates a scenario in which a modest rise in latency on a network with stable performance and low variance results in a detection of a chronic performance problem. The higher latency measurements shown with cross-hatching, will quickly result in the service performance threshold indicating a performance problem. Assuming the baseline conditions exhibited the latency stability (low variance) exhibited by the measurements shown on the left side of FIG. 3, after a relatively small number of higher-latency measurements, the t-test will identify the latency performance problem as chronic and set an alarm. In FIG. 3, by 6:00 am, corrective measures have been taken and the performance returns to normal. Subsequent slight increases in latency at 10:00 am and 2:00 are not identified as chronic problems.

While the invention has been described primarily in the context of "network performance," the techniques of the invention can be applied at various levels in the network architecture including specific applications and types or groups of applications. Thus, in this context, the invention is capable of monitoring "application performance" and can identify chronic performance problems with certain applications. One example of a suitable performance metric for applications would be TCP retries.

It will be appreciated that the embodiments described above and illustrated in the drawings represent only a few of the many ways of utilizing the principles of the present invention to identify chronic performance problems in a communication network. The invention is not limited to any particular context and applies equally to all types of data and applications.

The principles of the present invention may be applied not only to packetized communications networks (e.g. Frame Relay, SMDS, ATM, IP, etc.), but also to any communications network wherein performance metrics of transmitted data can be reliably measured. Thus the principles of the present invention could be applied, for example, to measure performance metrics such as latency, throughput, or jitter in a non-packetized leased-line network. In this respect, as used herein, the term PDU encompasses virtually any identifiable portion of a data stream from which the same identifier can be generated at two points in a network.

Although the preferred embodiment discloses a particular functional representation of the monitoring devices, any data gathering devices capable of capturing and recording performance metrics can be used according to the principles of the present invention.

Having described preferred embodiments of new and improved methods and apparatus for identifying chronic performance problems on data networks, it is believed that other modifications, variations and changes will be suggested to those skilled in the art in view of the teachings set forth herein. It is therefore to be understood that all such variations, modifications and changes are believed to fall within the scope of the present invention as defined by the appended claims. Although specific terms are employed herein, they are used in a generic and descriptive sense only and not for purposes of limitation.

What is claimed is:

1. A method of identifying a chronic performance problem on a data network, comprising:
    establishing a baseline performance level of at least one performance metric using a processor;
    determining an operating performance level of the at least one performance metric during operation of the network using the processor;
    identifying a chronic performance problem by performing both a first test and a second test, using the processor, the first test comprising a threshold test to determine whether the operating performance exceeds a performance threshold, the second test comprising a statistical test to determine whether a difference between a baseline performance level and the operating performance level is statistically significant, wherein the combination of the first and second tests distinguishes between chronic performance problems and transient performance problems and a chronic performance problem is identified in response to both the operating performance level exceeding the performance threshold and the difference between the baseline performance level and the operating performance level being statistically significant.

2. The method of claim 1, wherein establishing a baseline performance level includes:
    collecting a baseline sample comprising a plurality of measurements of the at least one performance metric taken over a period of time; and
    computing a baseline mean and variance of the baseline sample, the baseline mean and variance being indicative of the baseline performance level.

3. The method of claim 1, wherein determining an operating performance level includes:
    collecting an operating sample comprising a plurality of measurements of the at least one performance metric taken over a period of time; and
    computing an operating mean and variance of the operating sample, the operating mean and variance being indicative of the operating performance level.

4. The method of claim 1, wherein the difference between the baseline performance level and the operating performance level is determined to be statistically significant by performing a t-test based on the baseline mean and variance and the operating mean and variance.

5. The method of claim 4, further comprising:
    selecting a confidence level threshold associated with performing the t-test.

6. The method of claim 1, wherein the performance threshold is selected as a function of the baseline performance level.

7. The method of claim 1, wherein the performance threshold is selected as a function of a predetermined performance level representing unacceptable performance.

8. The method of claim 1, wherein the at least one performance metric includes at least one of: latency, jitter, throughput, data delivery ratio, and TCP retries.

9. The method of claim 1, wherein the performance metric is associated with at least one of: a circuit, a channel, a link, a site, an application, a user, and a device.

10. A system for identifying chronic performance problems on a data network, comprising:
    a plurality of monitoring devices configured to measure at least one performance metric at selected points in the network; and
    a processor configured to receive performance metric measurements from the monitoring devices, wherein the processor determines a baseline performance level of the at least one performance metric, determines an operating performance level of the at least one performance metric during operation of the network, and identifies a chronic performance problem by performing both a first test and a second test, the first test comprising a threshold test to determine whether the operating performance exceeds a performance threshold, the second test comprising a statistical test to determine whether a difference between a baseline performance level and the operating performance level is statistically significant, wherein the combination of the first and second tests distinguishes between chronic performance problems and transient performance problems and the processor identifies a chronic performance problem in response to both the operating performance level exceeding the performance threshold and the difference between the baseline performance level and the operating performance level being statistically significant.

11. The system of claim 10, wherein the processor receives from the plurality of monitoring devices a baseline sample comprising a plurality of measurements of the at least one performance metric taken over a period of time, and computes a baseline mean and variance of the baseline sample, the baseline mean and variance being indicative of the baseline performance level.

12. The system of claim 11, wherein the processor receives from the plurality of monitoring devices an operating sample comprising a plurality of measurements of the at least one performance metric taken over a period of time, and computes an operating mean and variance of the operating sample, the operating mean and variance being indicative of the operating performance level.

13. The system of claim 10, wherein the processor determines the difference between the baseline performance level and the operating performance level to be statistically significant by performing a t-test based on the baseline mean and variance and the operating mean and variance.

14. The system of claim 13, wherein the processor performs the t-test based on a selectable confidence level threshold.

15. The system of claim 10, wherein the processor selects the performance threshold as a function of the baseline performance level.

16. The system of claim 10, wherein the processor selects the performance threshold as a function of a predetermined performance level representing unacceptable performance.

17. The system of claim 10, wherein the at least one performance metric includes at least one of: latency, jitter, throughput, data delivery ratio, and TCP retries.

18. The system of claim 10, wherein the performance metric is associated with at least one of: a circuit, a channel, a link, a site, an application, a user, and a device.

19. A system for identifying chronic performance problems on a data network, comprising:

means for measuring at least one performance metric at selected points in the network; and means for determining a baseline performance level of the at least one performance metric;

means for determining an operating performance level of the at least one performance metric during operation of the network; and means for identifying a chronic performance problem by performing both a first test and a second test, the first test comprising a threshold test to determine whether the operating performance exceeds a performance threshold, the second test comprising a statistical test to determine whether a difference between a baseline performance level and the operating performance level is statistically significant, wherein the combination of the first and second tests distinguishes between chronic performance problems and transient performance problems and a chronic performance problem is identified in response to the operating performance level exceeding the performance threshold and the difference between the baseline performance level and the operating performance level is statistically significant.

* * * * *

UNITED STATES PATENT AND TRADEMARK OFFICE
CERTIFICATE OF CORRECTION

PATENT NO.        : 7,599,308 B2  
APPLICATION NO.   : 11/217477  
DATED             : October 6, 2009  
INVENTOR(S)       : Laver et al.

Page 1 of 1

It is certified that error appears in the above-identified patent and that said Letters Patent is hereby corrected as shown below:

Column 10, line 31, replace "an a value" with -- an $\alpha$ value --;

Column 12, line 67, replace "confidence (1-a)" with -- confidence (1-$\alpha$) --;

Column 13, line 2, replace "a problem (1-a)" with -- a problem (1-$\alpha$) --;

Column 13, line 5, replace "value of a" with -- value of $\alpha$ --;

Column 13, line 12, replace "value of a" with -- value of $\alpha$ --.

Signed and Sealed this

First Day of December, 2009

David J. Kappos  
*Director of the United States Patent and Trademark Office*